United States Patent [19]

Grover et al.

[11] Patent Number: 4,543,233

[45] Date of Patent: Sep. 24, 1985

[54] MECHANICALLY ATTACHED LOAD PAD FOR LIQUID METAL NUCLEAR REACTOR FUEL ASSEMBLIES

[75] Inventors: Jeffrey M. Grover, Kennewick, Wash.; Luanne S. Williams, Pleasanton, Calif.

[73] Assignee: The United States of America as represented by the United States Department of Energy, Washington, D.C.

[21] Appl. No.: 366,458

[22] Filed: Apr. 8, 1982

[51] Int. Cl.[4] .................................................. G21C 3/30
[52] U.S. Cl. .................................... 376/446; 376/448; 403/326; 277/236
[58] Field of Search ............... 376/448, 462, 438, 434, 376/446, 436, 303; 403/326, DIG. 6, DIG. 7; 277/236, 217, 204

[56] References Cited

U.S. PATENT DOCUMENTS

| 3,097,871 | 7/1963 | McNally ............................. 403/326 |
| 3,105,026 | 9/1963 | Dickson ............................. 376/446 |
| 3,318,401 | 5/1967 | Carbert ......................... 403/326 X |
| 3,791,466 | 2/1974 | Patterson et al. .................. 376/442 |
| 3,900,367 | 8/1975 | Class .................................... 376/303 |
| 3,964,969 | 6/1976 | Brynsvold et al. ................ 376/303 |
| 3,976,543 | 8/1976 | Sowa .................................. 376/444 |
| 4,111,747 | 9/1978 | Eck et al. ....................... 376/444 X |
| 4,119,489 | 10/1978 | Itoh et al. ....................... 376/446 X |
| 4,142,934 | 3/1979 | Wild ............................... 376/448 X |
| 4,369,893 | 1/1983 | Pennell et al. ..................... 277/236 |

FOREIGN PATENT DOCUMENTS 0126858 10/1979 Japan ................................. 403/326

Primary Examiner—Richard E. Schafer
Assistant Examiner—Daniel Wasil
Attorney, Agent, or Firm—Edward W. Nypaver; Robert Southworth, III; Judson R. Hightower

[57] ABSTRACT

A mechanically attached load pad for the duct of a liquid metal nuclear reactor fuel assembly.

4 Claims, 14 Drawing Figures

MECHANICALLY ATTACHED LOAD PAD FOR LIQUID METAL NUCLEAR REACTOR FUEL ASSEMBLIES

GOVERNMENT CONTRACT

This invention was conceived during performance of a contract with the United States Government designated DE-AC14-76FF02170.

BACKGROUND OF THE INVENTION

This invention relates to positioning and load bearing pads on fuel ducts for liquid metal cooled nuclear reactor fuel assemblies, especially for sodium cooled nuclear reactor fuel assemblies.

Fuel assemblies for nuclear reactors may be enclosed within a duct which serves to direct coolant flow through the fuel assembly. The fuel assemblies of the reactor are typically arranged in a grouping called the reactor core, which may contain hundreds of fuel assemblies. The array of fuel assemblies may cause adjacent fuel assembly ducts to abut on one another or surfaces of a core support grid. The fuel assembly duct may be provided with load pad structure, perhaps with a specially hardened surface, to bear contact between adjacent ducts or between ducts and a support grid. Such load pad is intended to endure chaffing and perhaps establish a desired clearance between ducts.

In current designs, the load pads are either welded to the ducts or are integral to the duct walls. The ducts are usually built of 316 stainless steel. As a result of radiation induced swelling, the useful life of a duct is limited to about three reactor fuel cycles. In an effort to extend duct life the use of ferritic steel for the ducts is being considered with the consequence that process steps used to form welded or integral load pads have become extremely difficult.

It is therefore desired to provide a load pad which is not welded or integral to the fuel assembly duct.

SUMMARY OF THE INVENTION

The invented load pad is a mechanically attached structure which fits snugly into a duct wall receptacle and is secured therein by a spring loaded, spirally wound ring which mates with a groove in the pad and a groove in the duct wall. The load pad has a hardened surface suitable for frictional wear resistance.

DETAILED DESCRIPTION

Figure 1:
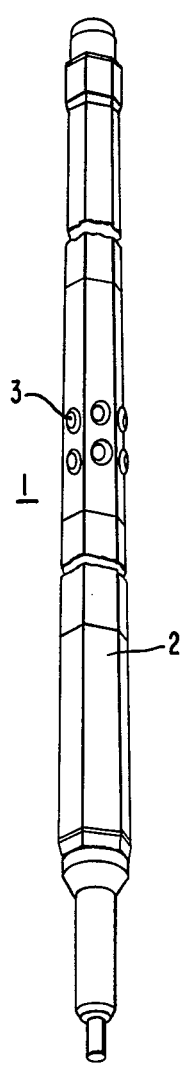
FIG. 1 is a schematic of a single fuel assembly having a duct with load pads.
Figure 2:
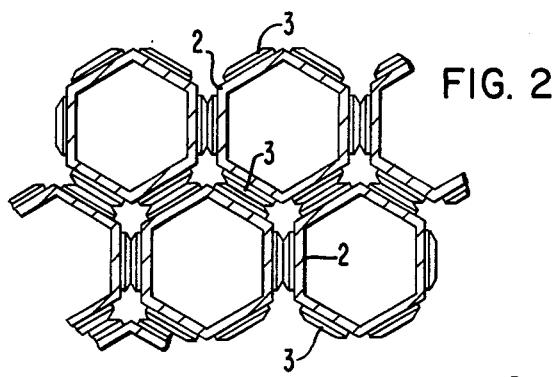
FIG. 2 is a plan schematic of fuel assemblies having load pads.

The overall function of load pads is illustrated by FIGS. 1 and 2. In FIG. 1, a fuel assembly 1 is shown having a duct 2, this example being a six sided fuel assembly 1 and duct 2. In a section of the fuel duct 2, generally above the active fuel region of fuel assembly 1, one or more load pads 3 are installed. Each face of duct 2 has at least one pad 3, unless the fuel assembly happens to be located in a core position, especially the core perimeter, at which position external faces may not bear on adjacent assemblies and load pads 3 may not be required. FIG. 2 illustrates how load pads 3 bear on one another. A beveled surface 4 (see FIG. 3) may be provided to facilitate movement of fuel assembly 1 up and down during installation and removal from the reactor. Beveled surface 4 eliminates or minimizes edge 5 upon which obstructing interference can occur.

Figure 3:
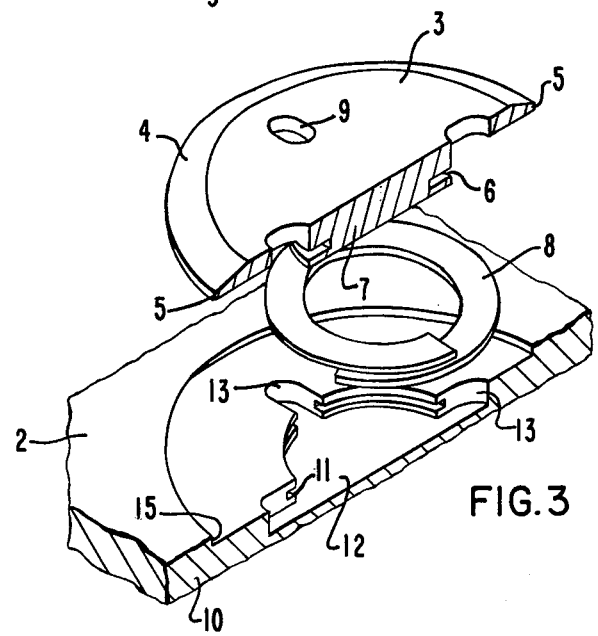
FIG. 3 is an exploded schematic of a sectioned load pad and duct.
Figure 4:
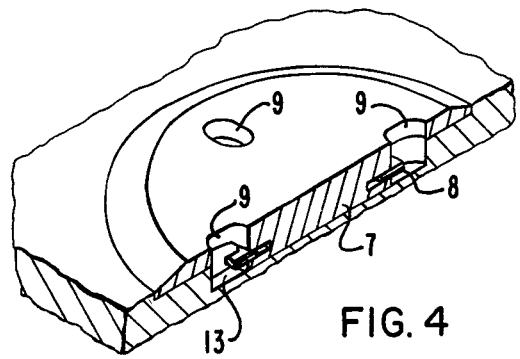
FIG. 4 is a sectioned schematic of an installed load pad.

Load pad 3 has a small groove 6 machined around the circumference of a stem 7 (refer to FIGS. 3 and 4). A spirally wound retaining ring 8 is assembled into machined groove 6. A plurality, preferably four oval slots 9 are machined through the flat pad portion; these slots 9 just nick the circumference of stem 7. Duct wall 10 has a hole 12 machined nearly through it; the hole 12 diameter is slightly larger than the diameter of load pad stem 7. A groove 11 is machined into the wall of hole 12 which will be aligned with groove 6 in stem 7. Also milled into duct wall 10 are oval slots 13 to match those slots 9 milled into the pad.

Figure 5:
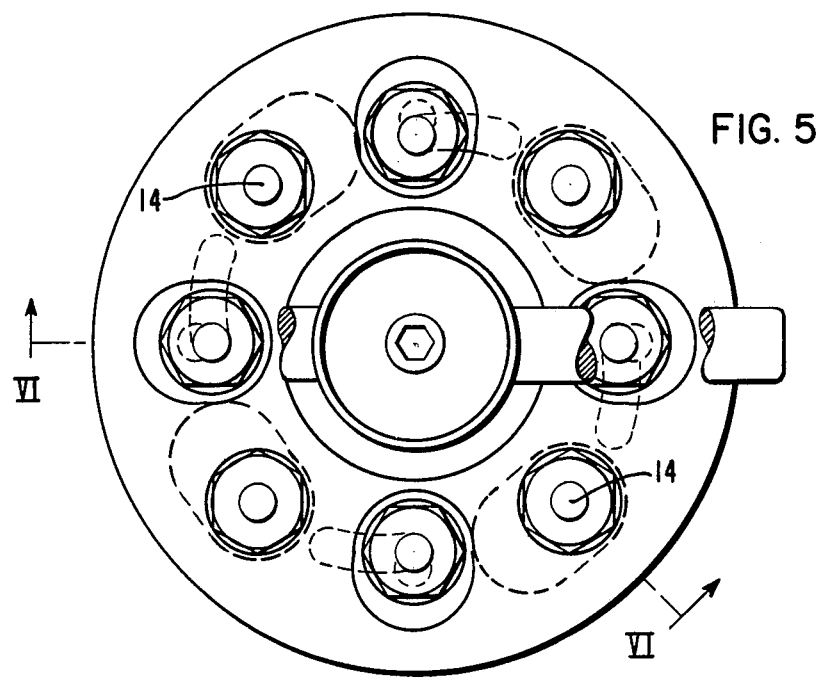
FIG. 5 is a plan schematic of a tool used for installation and removal of the load pad.
Figure 6:
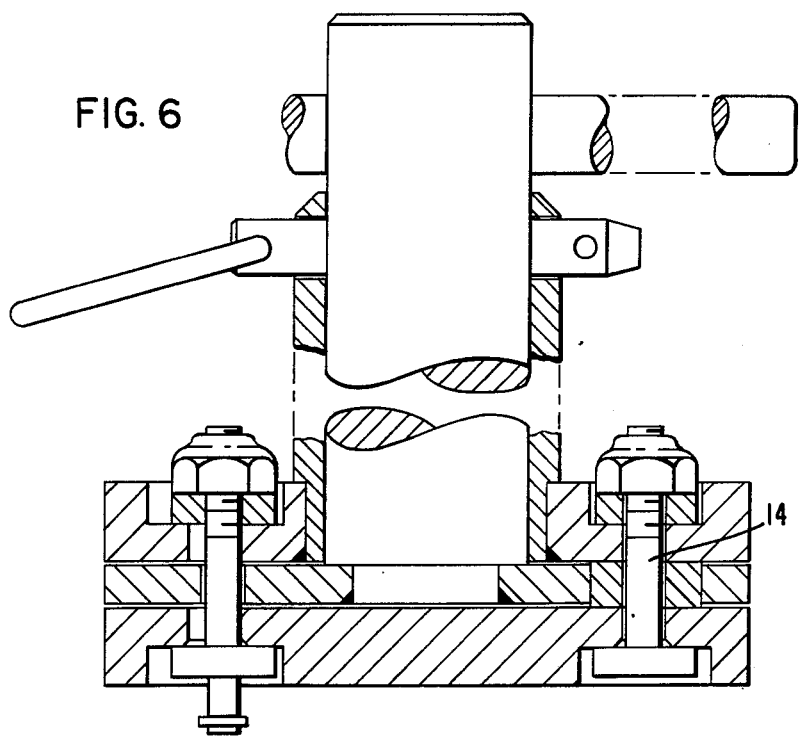
FIG. 6 is a profile schematic of the tool of FIG. 5.
Figure 7:
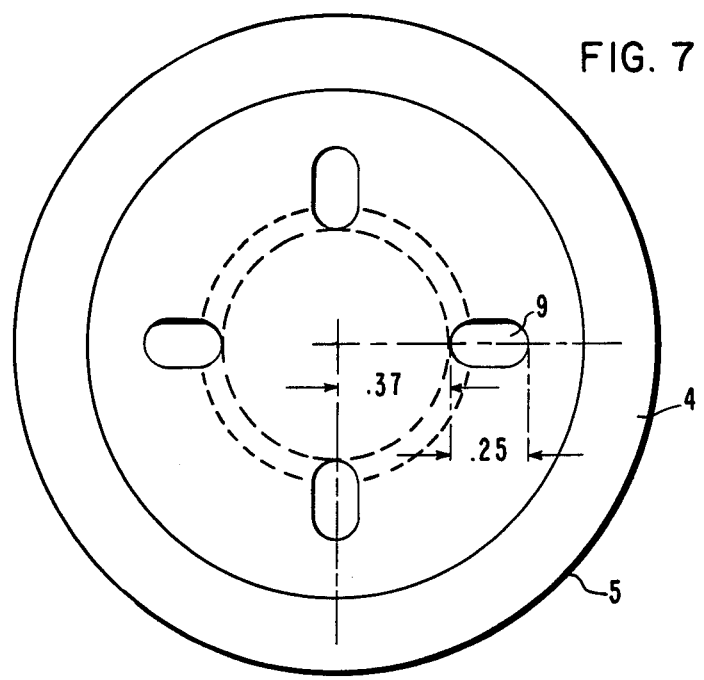
FIG. 7 is a plan schematic of an embodiment of a load pad.
Figure 8:
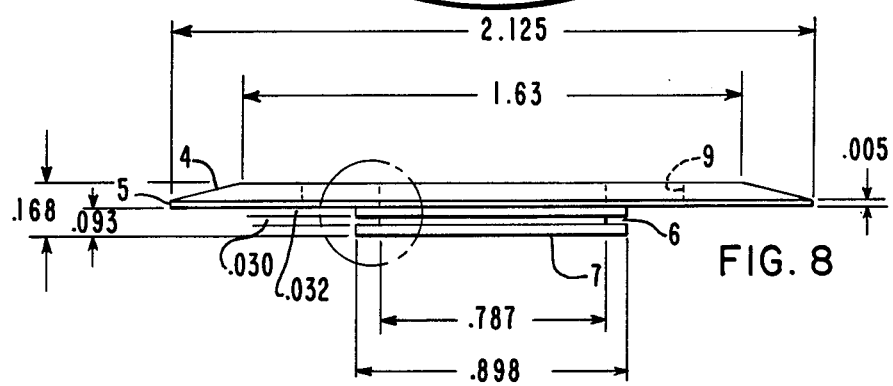
FIG. 8 is a profile schematic of an embodiment of a load pad.
Figure 9:
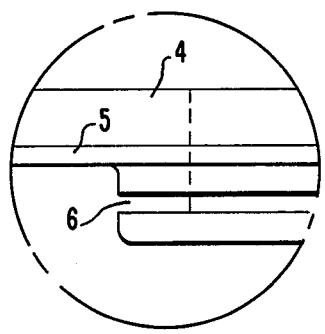
FIG. 9 is a detail from FIG. 8.
Figure 13:
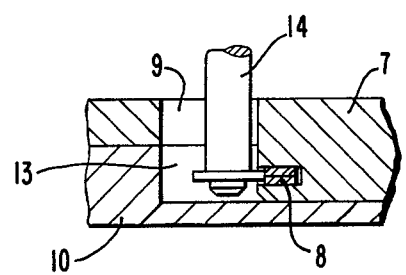
FIG. 13 is a detailed schematic of the tool of FIG. 6.
Figure 10:
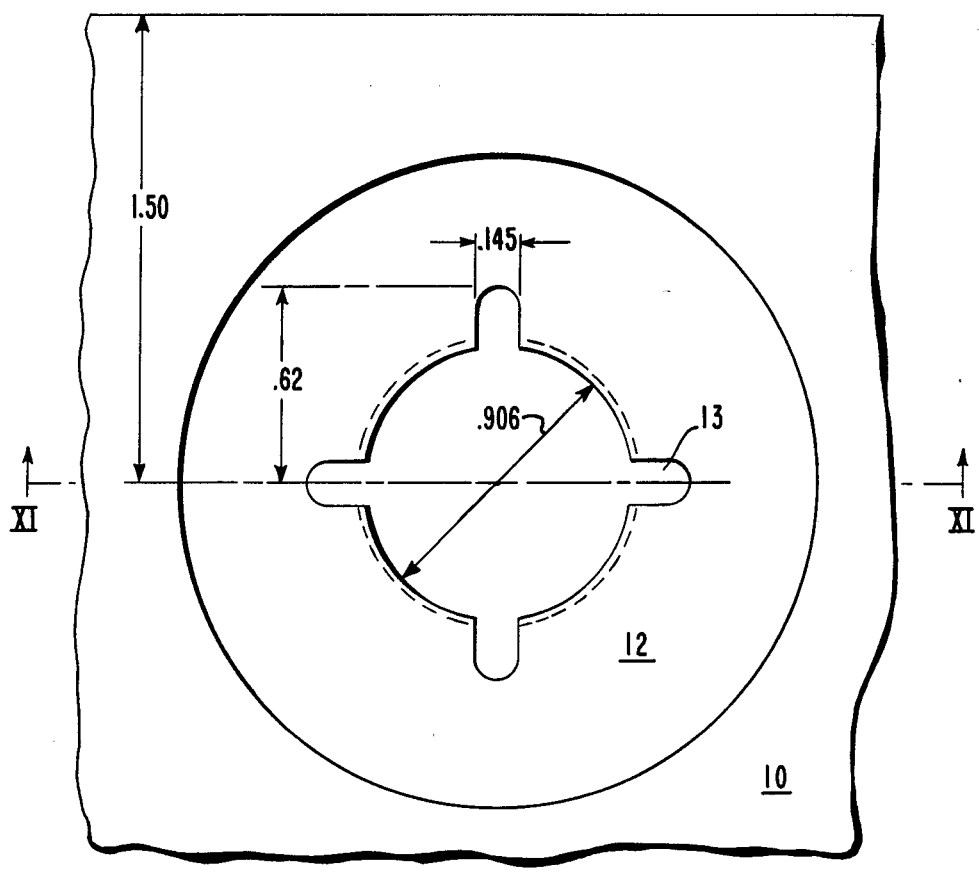
FIG. 10 is a plan schematic of an embodiment of a duct.
Figure 11:
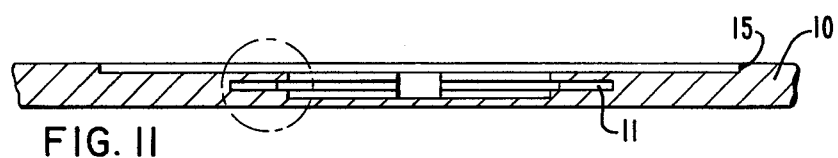
FIG. 11 is a profile schematic of an embodiment of a duct.
Figure 12:
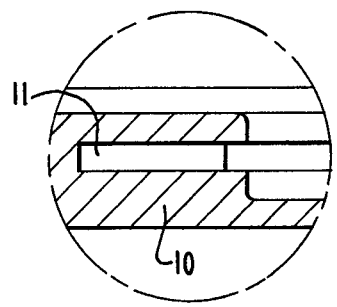
FIG. 12 is a detail from FIG. 11.

Load pad 3 is installed into duct wall 10 by means of a special tool (see FIGS. 5, 6 and 13). This tool has fingers 14 which drop through slots 9 in the load pad 3 and around ring 8 in its free state. By utilizing a cam action, fingers 14 are then moved toward the center of pad 3, compressing ring 8 to a diameter slightly less than that of stem 7. Load pad 3 is then positioned into hole 12 of duct wall 10 with the tool holding ring 8 compressed. The cam action of the tool is then reversed allowing ring 8 to expand into groove 11 of duct wall 10. The tool is then removed. The spirally wound retaining ring 8 now engages both groove 11 in duct wall 10 and groove 6 in load pad stem 7, locking the two together.

When installed, the forces which are applied between ducts 2 in the reactor are distributed over duct wall 10 by the broad surface of pad 3. Retaining ring 8 only has to prevent load pad 3 from falling away from duct 2. There are no appreciable forces in the direction and ring 8 has the capability of withstanding over 1000 pounds force. There are no conceivable forces that may break ring 8 into pieces, however, even if this were possible, a minimum of three breaks would be necessary before load pad 3 could be disengaged from duct wall 10, thus an inherent redundancy is provided.

A feature of this design is that it allows inspection of ring 8 engagement through holes 9. If a problem exists, load pad 3 can be removed through the use of the tool and the problem corrected.

The presence of hole 12 in duct wall 10 tends to weaken the duct, especially if load pads 3 on each face of the duct are located at a common elevation. To minimize this weakening effect, load pads on different faces of the duct may be located at different elevations. This requires a potentially complicated core loading plan because the load pads on adjacent faces must abut, and must therefore be at the same elevation.

Figure 14:
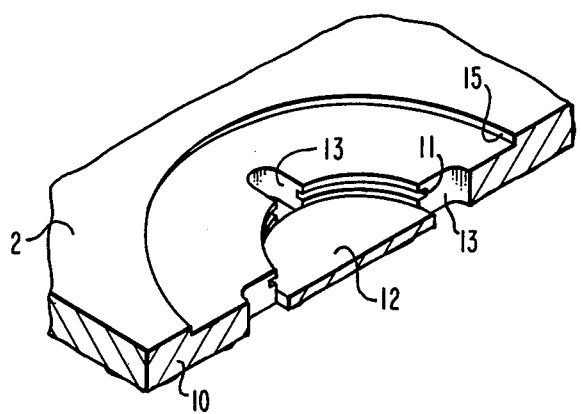
FIG. 14 is a schematic of a sectioned duct having a hole entirely therethrough.

Slots 13 in duct wall 10 are shown in the drawings to extend only partially through duct wall 10 such that no coolant flow through these holes occurs. If load pad 3 is located above the active fuel region of the fuel assembly, it may be desired to machine slots 13 completely through duct wall 10 thus allowing coolant flow to pass outside the duct via slots 13 and 9. See FIG. 14.

Once installed, load pad 3 as shown in the drawings is free to rotate, which will cause a loss of alignment between slots 9 and 13. Such rotation can be prevented by a variety of methods, including a pin and hole arrangement between duct wall 10 and load pad 3.

FIGS. 7 through 10 are design drawings bearing dimensions relative to a preferred embodiment.

The geometric shape of load pad 3 need not be circular but could obviously be of many shapes. The geometry of pad stem 7 and hole 12 also need not be circular, although a circular geometry here is appropriate to the use of ring 8. Substitution for ring 8 by other mechanical attachment means makes other geometries feasible.

We claim:

1. In combination with a fuel assembly for a liquid-metal-cooled nuclear reactor, said fuel assembly comprising an elongated hollow duct formed with six elongated wall surfaces, the improved load-pad assembly for said fuel assembly duct comprising:

each elongated wall surface of said duct which is to be provided with at least one load-pad assembly having at least one load-pad-receiving cylindrical aperture provided in the external surface thereof to receive a portion of said load-pad assembly;

each said load-pad assembly having an enlarged cylindrical pad portion and a cylindrical stem portion projecting from said enlarged pad portion, each said load-pad-assembly stem portion projecting into one of said cylindrical apertures in said duct with the enlarged pad portion of said load-pad assembly overlying those portion of said duct which surround said one cylindrical aperture in said duct, and the exposed surface of each said enlarged pad portion of said load-pad assembly having a flattened centrally disposed surface portion which projects from the external surface of said duct in which said load-pad assembly is located;

a portion of each said aperture in said duct having provided in the cylindrical surface thereof a peripheral retaining groove, a portion of each said load-pad-assembly stem portion having provided in the cylindrical surface thereof a peripheral retaining groove, the retaining groove provided in each said load-pad-assembly stem portion aligned with the retaining groove provided in each cylindrical aperture in said duct when each said load-pad assembly is operatively positioned on said duct, and an expandable and compressible spring member interfitting into both said retaining groove in each said cylindrical aperture in said duct and said aligned retaining groove in said load-pad-assembly stem portion to operatively retain said load-pad-assembly on said duct;

a plurality of tool-access apertures provided through said enlarged pad portion of said load-pad assembly;

a plurality of tool-access apertures provided in the external surface of said duct proximate each said cylindrical aperture therein, said tool-access apertures in said duct being located substantially radially outwardly from said retaining groove in said cylindrical surface of each said cylindrical aperture in said duct and opening into said retaining grooves, and said tool-access apertures in said enlarged pad portion of said load-pad assembly being alignable with said tool-access apertures in said duct; whereby said spring member can be compressed by a tool inserted through said tool-access apertures when aligned to compress said spring member into said retaining groove in said stem portion of said load-pad assembly to permit both insertion and removal of each said load-pad assembly from said duct.

2. The combination as specified in claim 1, wherein said fuel assembly duct has a portion thereof which contains the reactor fuel, said load-pad assembly is positioned above said fuel assembly duct portion which contains reactor fuel, and said tool-access apertures provided in said duct extend completely through the walls of said duct.

3. The combination as specified in claim 1, wherein said enlarged cylindrical pad portion of said load-pad assembly is provided with a beveled edge portion.

4. The combination as specified in claim 1, wherein said tool-access apertures provided in said duct project only partly through the walls of said duct.

* * * * *